(12) United States Patent
Lee

(10) Patent No.: US 8,802,254 B2
(45) Date of Patent: Aug. 12, 2014

(54) BATTERY MODULE

(75) Inventor: Hyun-Ye Lee, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 496 days.

(21) Appl. No.: 12/940,904

(22) Filed: Nov. 5, 2010

(65) Prior Publication Data

US 2012/0015218 A1  Jan. 19, 2012

(30) Foreign Application Priority Data

Jul. 19, 2010 (KR) .................. 10-2010-0069539

(51) Int. Cl.
*H01M 2/12* (2006.01)

(52) U.S. Cl.
CPC .............. *H01M 2/12* (2013.01); *H01M 2/1223* (2013.01); *H01M 2/1241* (2013.01)
USPC .......................................................... 429/53

(58) Field of Classification Search
CPC .... H01M 2/12; H01M 2/1233; H01M 2/1241
See application file for complete search history.

(56) References Cited

U.S. PATENT DOCUMENTS

| 5,538,807 | A | 7/1996 | Hagiuda |
| 5,541,016 | A | 7/1996 | Schumm, Jr. |
| 5,603,656 | A | 2/1997 | Baer et al. |
| 6,110,617 | A * | 8/2000 | Feres ........................... 429/86 |
| 6,660,425 | B2 * | 12/2003 | Jones et al. ..................... 429/53 |
| 7,927,727 | B2 | 4/2011 | Kim et al. |
| 2003/0077505 | A1 * | 4/2003 | Goda et al. ....................... 429/56 |
| 2005/0277017 | A1 * | 12/2005 | Cho ................................... 429/56 |
| 2007/0059586 | A1 * | 3/2007 | Matsumoto et al. ............ 429/53 |
| 2010/0167107 | A1 | 7/2010 | Byun et al. |

FOREIGN PATENT DOCUMENTS

| EP | 1 298 739 A1 | 4/2003 |
| EP | 1 798 788 A1 | 6/2007 |
| EP | 1 876 661 A1 | 1/2008 |
| JP | 62-122054 | 6/1987 |
| JP | 2004-281061 A | 10/2004 |
| JP | 2007-027011 A | 2/2007 |
| JP | 2007-179818 | 7/2007 |
| JP | 2008-270032 | 11/2008 |
| KR | 10-1999-0049247 | 7/1999 |
| KR | 10-2005-0121903 | 12/2005 |
| KR | 10-2006-0059713 | 6/2006 |
| KR | 10-2006-0086124 | 7/2006 |
| KR | 10-2010-0076699 | 7/2010 |
| WO | WO 2008/026854 A1 | 3/2008 |

OTHER PUBLICATIONS

KIPO Office action dated Apr. 9, 2012, for Korean priority Patent application 10-2010-0069539, (6 pages).

(Continued)

*Primary Examiner* — Barbara Gilliam
*Assistant Examiner* — Adam A Arciero
(74) *Attorney, Agent, or Firm* — Christie, Parker & Hale, LLP

(57) ABSTRACT

A battery module includes a plurality of rechargeable batteries and a housing configured to receive the rechargeable batteries, wherein the housing has a vent opening; and a valve configured to close the vent opening, wherein the valve includes a porous film with pores having a diameter larger than that of gas molecules and smaller than that of water particles.

17 Claims, 7 Drawing Sheets

(56) References Cited

OTHER PUBLICATIONS

European Search Report dated Jun. 27, 2011 corresponding to European Patent Application Serial No. 11152875.8; 8 Sheets.

KIPO Office Action issued Sep. 8, 2011 for Korean Application No. 10-2010-0069539 (4 pages).
English machine translation of JP 2004-281061 A, 10 pages.
English machine translation of JP 2007-027011 A, 19 pages.

\* cited by examiner

BATTERY MODULE

CROSS-REFERENCE TO RELATED APPLICATION

This application claims priority to and the benefit of Korean Patent Application No. 10-2010-0069539 filed in the Korean Intellectual Property Office on Jul. 19, 2010, the entire content of which is incorporated herein by reference.

BACKGROUND

1. Field

The described technology relates generally to a battery module.

2. Description of the Related Art

Unlike a primary battery that is not designed to be recharged, a rechargeable battery can be discharged and recharged. A low-capacity rechargeable battery has been used for a small-sized portable electronic device such as a mobile phone, a laptop computer, or a camcorder. A large-capacity battery has been prevalently used as a power supply for driving a motor of a hybrid vehicle, or the like.

Recently, a high-power rechargeable battery using a non-aqueous electrolyte and having a high energy density has been developed. The above-mentioned high power rechargeable battery is configured as a large-capacity rechargeable battery by connecting a plurality of rechargeable batteries in series to be able to drive a motor for devices requiring large power, such as an electric vehicle, etc.

In addition, one large-capacity rechargeable battery is configured from a plurality of rechargeable batteries generally connected to each other in series and the rechargeable battery may be a cylindrical shape or a quadrangular shape.

A rechargeable battery includes an exhaust member that opens when the internal pressure is increased. This is to prevent the explosion of the rechargeable battery due to the increase in the internal pressure of the rechargeable battery.

The gas discharged from the rechargeable battery should be rapidly discharged to the outside. If gas in the rechargeable battery is not rapidly discharged to the outside, the rechargeable battery may explode or ignite. In order to rapidly discharge the gas in the rechargeable battery, the pressure in the housing of the battery module should be sufficiently low. However, when the rechargeable batteries are positioned in the closed and sealed housing, the pressure in the housing is not sufficiently low to rapidly discharge gas and the rechargeable battery may explode.

For example, since the pressure in the housing is increased after the exhaust member of one rechargeable battery is opened, gas is not rapidly discharged because the exhaust members of the other rechargeable batteries are also opened in this state, causing increased internal pressure such that the rechargeable battery may explode.

The above information disclosed in this Background section is only for enhancement of understanding of the background of the described technology and therefore it may contain information that does not form the prior art that is already known in this country to a person of ordinary skill in the art.

SUMMARY

The described technology provides a battery module with an improved safety.

According to aspects of embodiments of the present invention, a housing surrounding a battery module has a vent opening that is provided with a porous film, thereby making it possible to stably discharge gas generated from the inside of the battery module.

An exemplary embodiment of the present invention provides a battery module including: a plurality of rechargeable batteries, a housing configured to receive the rechargeable batteries, wherein the housing has a vent opening; and a valve configured to close the vent opening, wherein the valve includes a porous film with pores having a diameter larger than that of gas molecules and smaller than that of water particles.

The porous film may include polytetrafluoroethylene (PTFE).

The porous film may include a material selected from the group consisting of perfluoroalkoxy polymer (PFA), fluorinated ethylene propylene (FEP), ethylene chlorotrifluoroethylene copolymer (ECTFE), ethylene tetrafluoroethylene (ETFE), polyvinylidene fluoride (PVDF), and combinations thereof.

In one embodiment, the porous film may have a notch.

The valve may further include a supporting film stacked on the porous film. In one embodiment, the supporting film may have a notch. The supporting film may have a strength greater than that of the porous film, and may be configured to pass gas molecules therethrough.

In one embodiment, the housing includes a body having an inner space and a cover coupled with the body, and the valve may be installed on the cover. In one embodiment, the valve may be installed on the body.

The valve may further include a protective bar that crosses the vent opening and contacts the porous film. In one embodiment, the protective bar may have a wedge portion contacting the porous film, wherein the wedge portion has a reduced sectional area toward an end thereof.

The battery module may further include a supporting member having a ring shape to closely attach the porous film to the housing. The supporting member may have an opening, and the supporting member may further include a protrusion having a wedge shape and protruding toward the porous film along a periphery of the opening of the supporting member. A groove may be formed under the vent opening and the porous film, and the supporting member may be inserted into the groove.

In one embodiment, a protrusion having a wedge shape and protruding toward the porous film may be formed along the periphery of the vent opening.

Another exemplary embodiment of the present invention provides a battery module including a plurality of rechargeable batteries, a housing configured to receive the rechargeable batteries, wherein the housing has a vent opening; and a valve configured to close the vent opening and to be ruptured at a rupture pressure, wherein the valve is configured to pass gas molecules through the valve and block liquid molecules. In one embodiment, the valve may have a notch.

Figure 1:
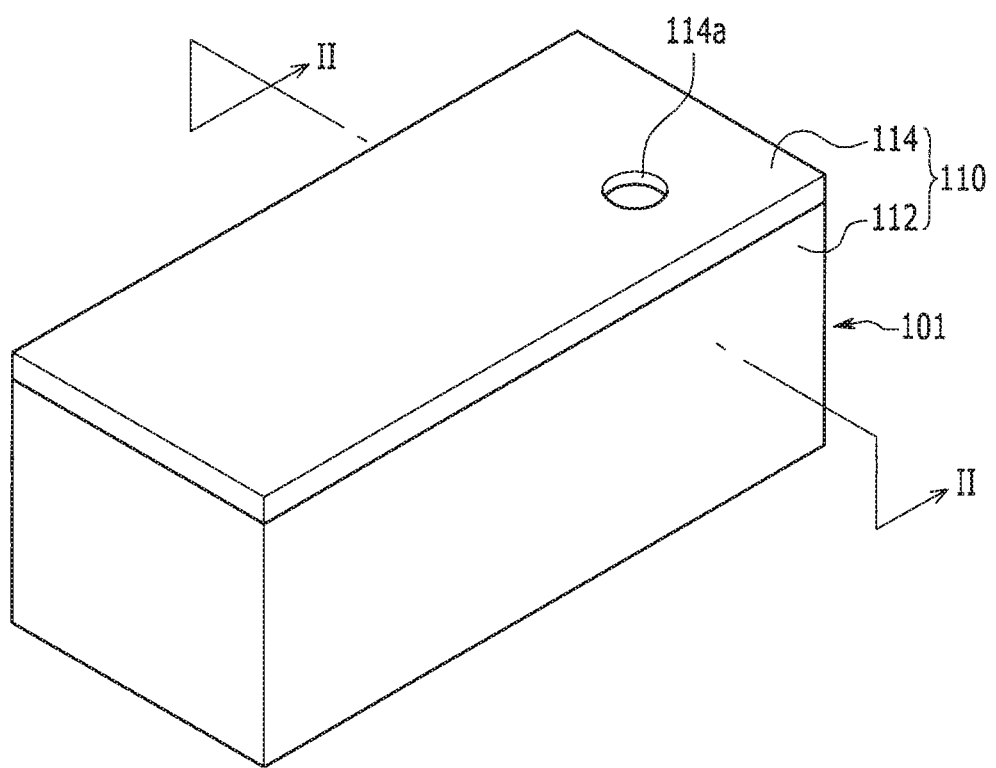
FIG. 1 is a perspective view showing a battery module according to a first exemplary embodiment of the present invention.

| Description of Some of the Reference Numerals | |
|---|---|
| 101, 102: Battery module | 110, 410: Housing |
| 112, 412: Body | 114, 214, 264, 314, 414: Cover |
| 114a, 214a, 284a, 314a, 412a: Vent hole (or vent opening) | |
| 120: Rechargeable battery | 121: Exhaust member |
| 123: Positive terminal | 124: Negative terminal |
| 125: Connection member | |
| 130, 230, 251, 261, 331, 430: Porous film | |
| 131: Pore | 214b, 264c: Groove |
| 231, 335: Notch | 240, 252: Supporting member |
| 241, 252b: Opening | 252a, 264b: Protrusion |
| 330: Valve member (e.g., valve) | 332: Supporting film |
| 450: Protective bar | 451: Wedge portion |

DETAILED DESCRIPTION

Exemplary embodiments of the present invention will be described more fully hereinafter with reference to the accompanying drawings. As those skilled in the art would realize, the described embodiments may be modified in various different ways, all without departing from the spirit or scope of the present invention. In addition, like reference numerals denote like elements in the specification and the accompanying drawings.

Figure 2:
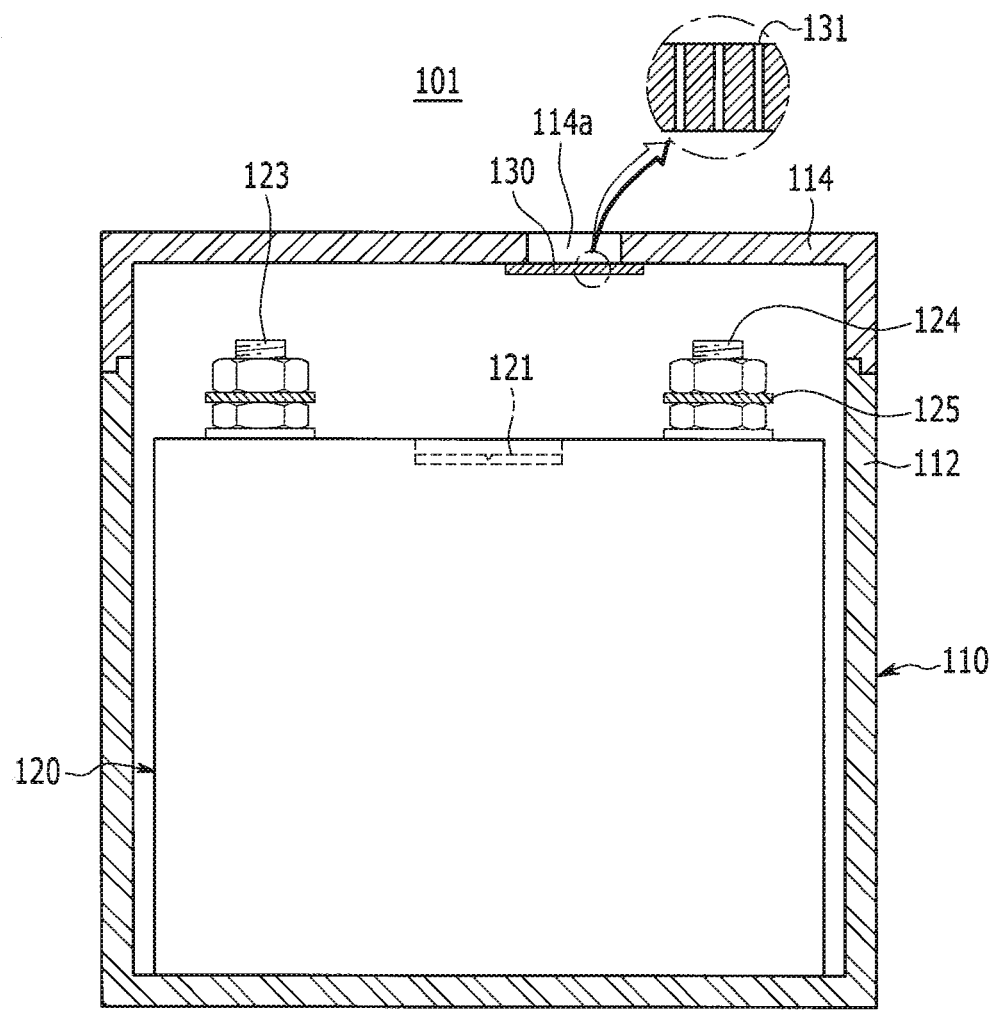
FIG. 2 is a cross-sectional view taken along the line II-II of FIG. 1.

FIG. 1 is a perspective view showing a battery module according to a first exemplary embodiment of the present invention and FIG. 2 is a cross-sectional view taken along the line II-II of FIG. 1.

Referring to FIGS. 1 and 2, a battery module 101 according to the first exemplary embodiment includes a plurality of rechargeable batteries 120, a housing 110 in which the rechargeable batteries 120 are accommodated, and a valve member (e.g., a valve) installed in a vent hole (or a vent opening) 114a of the housing 110.

A plurality of rechargeable batteries 120 are installed in the housing 110. By way of example, the rechargeable battery 120 will be described as a lithium ion secondary battery having a generally quadrangular shape. However, the present invention is not limited thereto, and embodiments of the present invention may be applied to batteries of various types such as a lithium polymer battery or a cylindrical battery, etc.

The rechargeable battery 120 includes a positive terminal 123, a negative terminal 124, and an exhaust member 121 that is opened at a rupture pressure (e.g., predetermined pressure) to discharge gas. The exhaust member 121 is ruptured at the rupture pressure (e.g., predetermined pressure) when the pressure in the rechargeable battery 120 is increased, to provide a path that can discharge the gas in the rechargeable battery 120 to the outside.

The plurality of rechargeable batteries 120 are installed in the housing 110 and connected in series by a connection member 125.

The housing 110 may be formed in a rectangular parallelepiped shape and includes a body 112 having an inner space and a cover 114 coupled with the body 112.

The housing 110 is formed to have a closed and sealed structure and the rechargeable batteries 120 are cooled by cooling the housing 110.

A vent hole (or a vent opening) 114a may be formed on the cover 114 and may have a circular sectional shape. A valve member (e.g., a valve) may be installed to close the vent hole (or the vent opening) 114a and may be formed of the porous film 130. In one embodiment, the porous film may be made of Teflon®-based resin, for example, polytetrafluoroethylene (PTFE) (Teflon® is a registered trademark of E. I. Du Pont De Nemours and Company). In addition, the porous film may be made of perfluoroalkoxy polymer (PFA), fluorinated ethylene propylene (FEP), ethylene chlorotrifluoroethylene copolymer (ECTFE), ethylenete trafluoroethylene (ETFE), polyvinylidene fluoride (PVDF), or a combination thereof.

The porous film 130 is formed with pores 131 having a diameter larger than that of gas molecules and smaller than that of water particles. Therefore, gas molecules such as nitrogen ($N_2$), hydrogen ($H_2$), carbon monoxide (CO), and methane ($CH_4$) may pass through the porous film 130 but water particles may not, thereby making it possible to discharge the gas in the housing 110 to the outside and prevent liquid, etc., from being infiltrated (or infiltrating) into the housing 110 from the outside.

As such, according to an exemplary embodiment, when the exhaust member 121 (e.g., gas discharging unit) installed in the rechargeable battery 120 is opened to discharge gas from the inside of the rechargeable battery 120, the gas may be discharged from the housing 110 through the porous film 130. In addition, the first exemplary embodiment can prevent (or substantially prevent) water or foreign materials outside the housing 110 from being infiltrated (or infiltrating) into the housing 110.

In addition, the porous film 130 may be ruptured at a rupture pressure (e.g., predetermined pressure), wherein the rupture pressure of the porous film 130 may be determined according to the thickness of the porous film 130. When the exhaust members 121 mounted in the plurality of rechargeable batteries 120 are opened to discharge gas from the rechargeable batteries 120, the pressure in the housing 110 is greatly increased instantly. In this case, the porous film 130 may be broken to rapidly discharge the gas in the housing 110 to the outside.

When the internal pressure of the housing 110 is below the rupture pressure of the porous film 130, the gas may be discharged through the porous film 130 without breaking the porous film 130. However, when the internal pressure thereof is largely increased, there is a need to discharge a large amount of gas at one time. As a result, the porous film 130 is broken to smoothly discharge gas.

Figure 3:
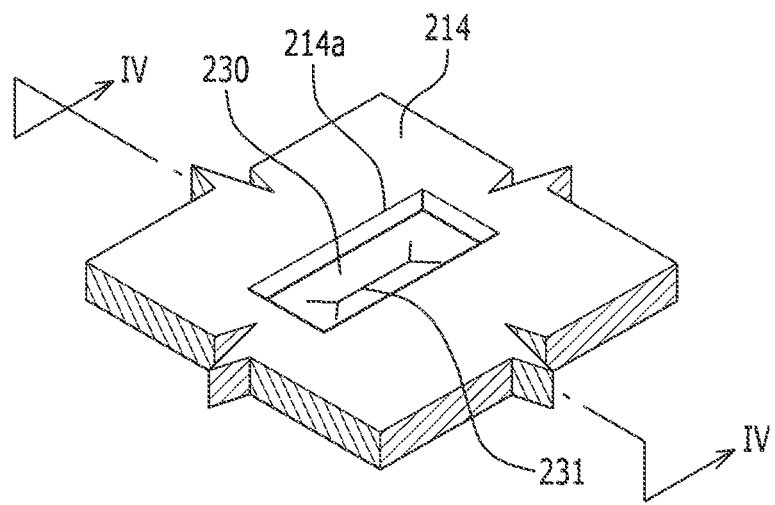
FIG. 3 is a perspective view showing a vent member (e.g., a vent) installed in a housing according to a second exemplary embodiment of the present invention.
Figure 4:
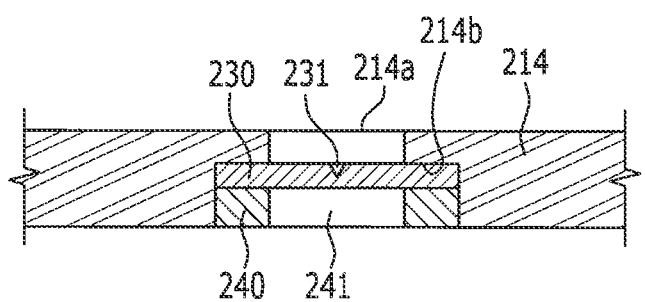
FIG. 4 is a cross-sectional view taken along the line IV-IV of FIG. 3.

FIG. 3 is a perspective view showing a vent member (e.g., a vent) installed in a housing according to a second exemplary embodiment of the present invention and FIG. 4 is a cross-sectional view taken along the line IV-IV of FIG. 3.

Referring to FIGS. 3 and 4, a battery module according to the second exemplary embodiment is substantially the same as the battery module according to the first exemplary embodiment except for the structure of the valve member (e.g., the valve) and therefore, repeated description of the same components will be omitted.

The cover 214 of the housing of the battery module according to the second exemplary embodiment is provided with a vent hole (or a vent opening) 214a and a valve member (e.g., a valve) to close the vent hole (or the vent opening) 214a. The vent hole (or the vent opening) 214a may be formed in a generally quadrangular sectional shape and the valve member (e.g., the valve) may be attached below the vent hole (or the vent opening) 214a.

The valve member (e.g., the valve) includes the porous film 230, which is provided with pores having a diameter larger than that of gas molecules and smaller than that of water particles. In one embodiment, the porous film 230 may be made of Teflon®-based resin, for example, polytetrafluoroethylene (PTFE).

A groove 214b is formed under the vent hole (or the vent opening) 214a, wherein the groove 214b is formed, for example, continuously along the periphery (e.g., circumferential direction) of the vent hole (or the vent opening) 214a. The porous film 230 may be inserted into the groove 214b, and a supporting member 240 closely attaching the porous film 230 to the groove 214b may be installed under the porous film 230. The supporting member 240 and/or the groove 214b may have a rectangular or any other suitable shape to conform to the shape of the vent hole (or the vent opening) 214a. In one embodiment, the supporting member 240 is formed in a ring shape where an opening 241 is formed at the center thereof. The supporting member 240 may be inserted into the groove 214b to support the porous film 230 by contacting the edge of the porous film 230.

In one embodiment, the porous film 230 is formed with a notch 231 to be ruptured at a rupture pressure (e.g., predetermined pressure) to discharge gas from the housing to the outside through the porous film 230. When the internal pressure of the housing is increased at a rapid speed, the notch 231 may be ruptured to discharge gas to the outside. Since the support member 240 fixes (or secures) the edge of the porous film 230, the notch 231 may be easily broken at the rupture pressure (e.g., predetermined pressure). The porous film 230 may be fused to the cover 214, such that when the pressure is increased, the notch 231 is not broken but the fused portion may be separated. When the fused portion is separated, the opened area may be small and may not rapidly discharge gas. However, when the supporting member 240 is installed, the notch 231 is more stably broken, thereby making it possible to rapidly discharge gas.

Figure 5:
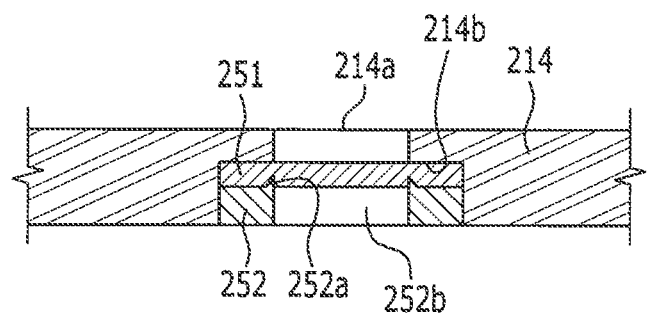
FIG. 5 is a cross-sectional view showing a vent member (e.g., a vent) installed in a housing in a battery module according to a third exemplary embodiment of the present invention.

FIG. 5 is a cross-sectional view showing a vent member (e.g., a vent) installed in a housing in a battery module according to a third exemplary embodiment of the present invention.

The battery module according to the third exemplary embodiment is substantially the same as the battery module according to the second exemplary embodiment except for the structure of the valve member (e.g., the valve) and therefore, repeated description of the same components will be omitted.

The cover 214 of the battery module according to the third exemplary embodiment is provided with a vent hole (or a vent opening) 214a and is installed with a valve member (e.g., a valve) to cover the vent hole (or the vent opening) 214a.

The valve member (e.g., the valve) includes a porous film 251, wherein the porous film 251 is formed with pores having a diameter larger than that of gas molecules and a diameter smaller than that of water particles. In one embodiment, the porous film 251 may be made of Teflon®-based resin, for example, polytetrafluoroethylene (PTFE).

A groove 214b may be formed under the vent hole (or the vent opening) 214a, wherein the groove 214b is formed, for example, continuously along the periphery (e.g., circumferential direction) of the vent hole (or the vent opening) 214a. The porous film 251 may be inserted into the groove 214b and a supporting member 252 closely attaching the porous film 251 to the groove 214b may be installed under the porous film 251. Therefore, the porous film 251 may be positioned between the cover 214 and the supporting member 252.

The supporting member 252 and/or the groove 214b may have a rectangular or any other suitable shape to conform to the shape of the vent hole (or the vent opening) 214a. In one embodiment, the supporting member 252 is formed in a ring shape where an opening 252b is formed at the center thereof, and the supporting member 252 is inserted into the groove 214b to support the porous film 251 by contacting the edge of the porous film 251.

The upper surface of the supporting member 252 may be provided with a protrusion 252a, wherein the protrusion 252a has a reduced sectional area towards an end thereof to sharply protrude in a wedge shape. The protrusion 252a may be formed, for example, continuously along the periphery (e.g., circumference) of the opening 252b and the protrusion 252a presses the porous film 251.

Gas may be discharged from the housing 110 to the outside through the porous film 251 and when the internal pressure of the housing is increased at a rapid speed, a portion of the porous film 251 contacting the protrusion 252a may be broken to discharge gas to the outside. For example, since the support member 252 fixes (or secures) the edge of the porous film 251, the portion of the porous film 251 contacting the protrusion 252a may be easily broken at a rupture pressure (e.g., predetermined pressure). The porous film 251 may be fused to the cover 214, such that when the pressure is increased, the porous film 251 is not broken but the fused portion may be separated. When the fused portion is separated, the opened area may be small and may not rapidly discharge gas. However, when the supporting member 252 is installed, the porous film 251 may be broken, thereby making it possible to rapidly discharge gas.

Figure 6:
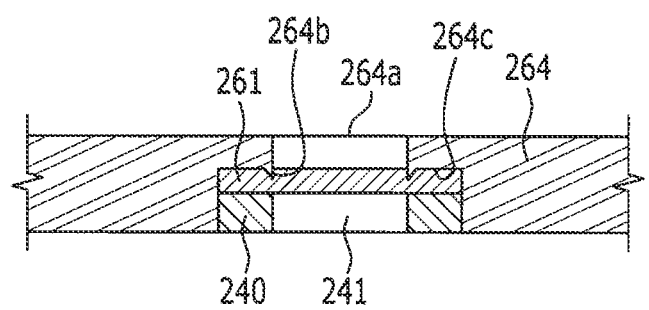
FIG. 6 is a cross-sectional view showing a vent member (e.g., a vent) installed in a housing in a battery module according to a fourth exemplary embodiment of the present invention.

FIG. 6 is a cross-sectional view showing a vent member (e.g., a vent) installed in a housing in a battery module according to a fourth exemplary embodiment of the present invention.

The battery module according to the fourth exemplary embodiment is substantially the same as the battery module according to the second exemplary embodiment except for the structure of the valve member (e.g., the valve) and therefore, repeated description of the same components will be omitted.

A cover 264 of the housing of the battery module according to the fourth exemplary embodiment is provided with a vent hole (or a vent opening) 264a and is installed with a valve member (e.g., a valve) to cover the vent hole (or the vent opening) 264a.

The valve member (e.g., the valve) includes a porous film 261, wherein the porous film 261 is formed with pores having a diameter larger than that of gas molecules and a diameter smaller than that of water particles. The porous film 261 may be made of Teflon®-based resin, for example, polytetrafluoroethylene (PTFE).

A groove 264c may be formed under a vent hole (or a vent opening) 264a, wherein the groove 264c is formed, for example, continuously along the periphery (e.g., circumferential direction) of the vent hole (or the vent opening) 264a. The porous film 261 may be inserted into the groove 264c and a supporting member 240 closely attaching the porous film 261 to the groove 264c may be installed under the porous film 261. The supporting member 240 and/or the groove 264c may have a rectangular or any other suitable shape to conform to the shape of the vent hole (or the vent opening) 264a. In one embodiment, the supporting member 240 is formed in a ring shape where an opening 241 is formed at the center thereof. The supporting member 240 may be inserted into the groove 264c to support the porous film 261 by contacting the edge of the porous film 261.

The periphery (e.g., circumference) of the vent hole (or the vent opening) 264a may be provided with a protrusion 264b protruded toward the porous film 261, wherein the protrusion 264b has a reduced sectional area towards an end thereof to sharply protrude in a wedge shape. In one embodiment the protrusion 264b is formed, for example, continuously along the periphery (e.g., circumference) of the groove 264c and the protrusion 264b presses the porous film 261.

Gas may be discharged from the housing 110 to the outside through the porous film 261, and when the internal pressure of the housing 110 is increased at a rapid speed, a portion of the porous film 261 contacting the protrusion 264b may be broken to discharge gas to the outside. For example, since the support member 240 fixes (or secures) the edge of the porous film 261, the portion of the porous film 261 contacting the protrusion 264b may be easily broken at a rupture pressure (e.g., predetermined pressure). The porous film 261 may be fused to the cover 264, such that when the pressure is increased, the porous film 261 is not broken but the fused portion may be separated. When the fused portion is separated, the opened area may be small and may not rapidly discharge gas. However, when the supporting member 240 is installed, the porous film 261 may be broken, thereby making it possible to rapidly discharge gas.

Figure 7:
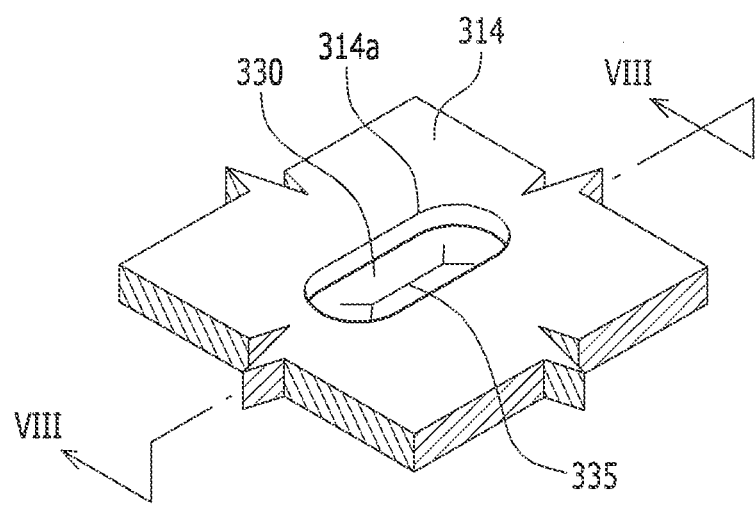
FIG. 7 is a cross-sectional view showing a vent member (e.g., a vent) installed in a housing in a battery module according to a fifth exemplary embodiment of the present invention.
Figure 8:
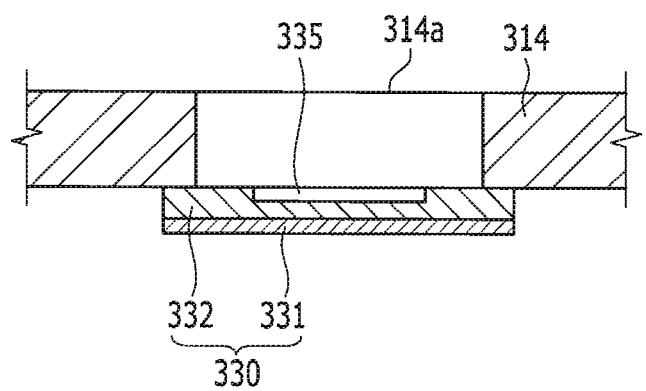
FIG. 8 is a cross-sectional view taken along the line VIII-VIII of FIG. 7.

FIG. 7 is a cross-sectional view showing a vent member (e.g., a vent) installed in a housing in a battery module according to a fifth exemplary embodiment of the present invention and FIG. 8 is a cross-sectional view taken along the line of FIG. 7.

Referring to FIGS. 7 and 8, the battery module according to the fifth exemplary embodiment is substantially the same as the battery module according to the first exemplary embodiment except for the structure of the valve member (e.g., the valve) and therefore, repeated description of the same components will be omitted.

The cover 314 of the battery module according to the fifth exemplary embodiment is provided with a vent hole (or the vent opening) 314a and may be installed with a valve member (e.g., the valve) 330 to cover the vent hole (or the vent opening) 314a.

The valve member (e.g., the valve) 330 includes a porous film 331 which may be made of Teflon®based resin and a supporting film 332 stacked on the porous film 331 and the supporting film 332 is located on the porous film 331.

The porous film 331 is formed with pores having a diameter larger than that of gas molecules and a diameter smaller than that of water particles, and the supporting film 332 is formed to have a structure capable of passing gas. The supporting film 332 may be formed to have strength greater than that of the porous film 331 to protect the porous film 331 from external impact. In one embodiment the supporting film 332 is formed with a notch 335 to be open at a rupture pressure (e.g., predetermined pressure).

Installing the supporting film 332 as in the fifth exemplary embodiment can prevent the porous film 331 from being ruptured due to external impact. In addition, since the supporting film 332 may be formed with the notch 335, it can more easily set the opening pressure of the valve member (e.g., the valve) 330. Gas may be discharged from the housing to the outside through the porous film 331 and when the internal pressure of the housing is increased at a rapid speed, the notch 335 may be broken to discharge gas to the outside.

Figure 9:
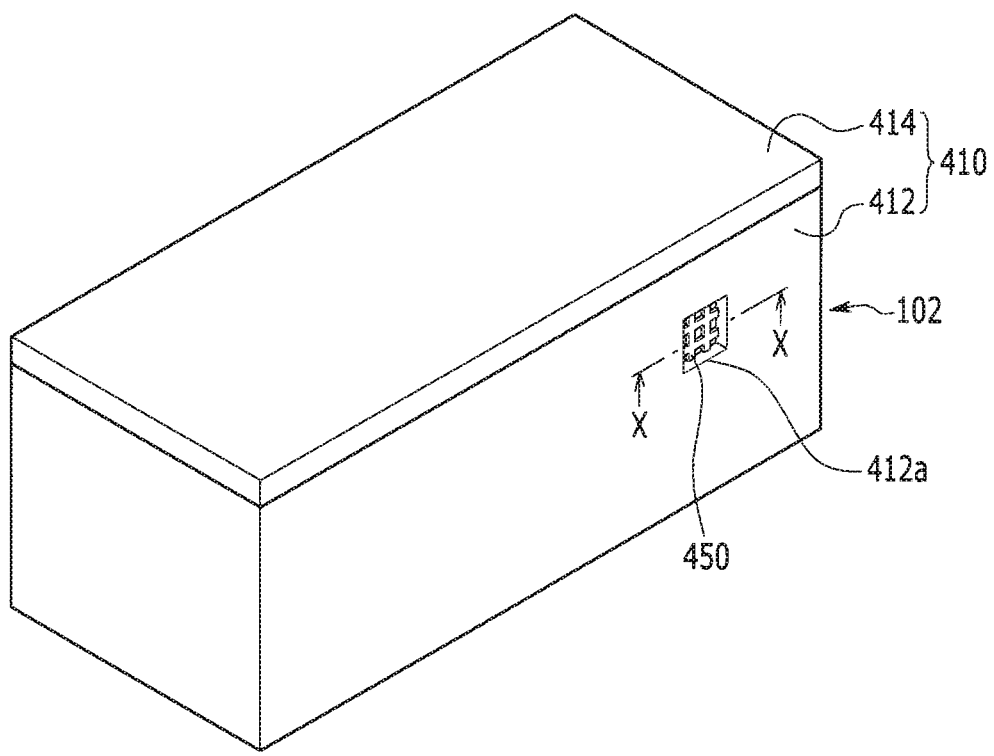
FIG. 9 is a perspective view showing a battery module according to a sixth exemplary embodiment of the present invention.
Figure 10:
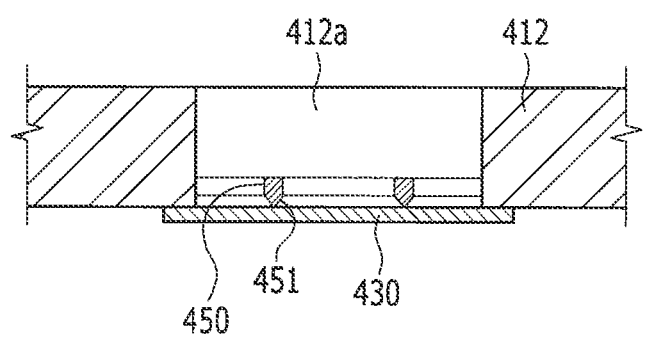
FIG. 10 is a cross-sectional view taken along the line X-X of FIG. 9.

FIG. 9 is a perspective view showing a battery module according to a sixth exemplary embodiment of the present invention and FIG. 10 is a cross-sectional view taken along the line X-X of FIG. 9.

Referring to FIGS. 9 and 10, a battery module 102 according to the sixth exemplary embodiment includes a plurality of rechargeable batteries, a housing 410 in which the rechargeable batteries are contained, and a valve member (e.g., a valve) installed in a vent hole (or a vent opening) 412a formed in the housing 410.

The housing 410 may be formed in a rectangular parallelepiped shape and includes a body 412 having an inner space and a cover 414 coupled with the body 412. The body 412 is formed with the vent hole (or the vent opening) 412a, wherein the vent hole (or the vent opening) 412a may be formed on a side of the body 412 and may have a generally quadrangular shape.

The valve member (e.g., the valve) includes a protective bar 450 that is installed to close the vent hole (or the vent opening) 412a, and installed contacting the porous film 430.

The porous film 430 may be made of Teflon®-based resin, for example, polytetrafluoroethylene (PTFE).

The porous film 430 is formed with pores having a diameter larger than that of gas molecules and a diameter smaller than that of water particles. Therefore, gas molecules may pass through the porous film 430 but water particles may not, thereby making it possible to discharge the gas in the housing 410 to the outside and prevent liquid from infiltrating into the housing from the outside.

The plurality of protective bars 450 are installed to cross the vent hole (or the vent opening) 412a in a lattice shape intersecting with each other. The protective bars 450 serve to prevent (or substantially prevent) the porous film 430 from being broken due to external impact or vibrations.

In the protective bar 450, the portion contacting the porous film 430 may include a wedge portion 451 sharply formed by reducing the sectional area towards an end thereof. The wedge portion 451 presses the porous film 430 and when the internal pressure of the housing is rapidly increased, the porous film 430 may be broken by the wedge portion 451.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

What is claimed is:

1. A battery module comprising:
   a plurality of rechargeable batteries;
   a housing configured to receive the rechargeable batteries into an inner space, wherein the housing has a vent opening configured to discharge gas molecules from an interior side of the housing to an exterior side of the housing; and
   a valve configured to close the vent opening, wherein the valve comprises a porous film with pores having a diameter larger than that of the gas molecules and smaller than that of water particles, and wherein the porous film is located in the inner space and is partially on and overlapped with the interior side of the housing.

2. The battery module of claim 1, wherein the porous film comprises polytetrafluoroethylene (PTFE).

3. The battery module of claim 1, wherein the porous film comprises a material selected from the group consisting of perfluoroalkoxy polymer (PFA), fluorinated ethylene propylene (FEP), ethylene chlorotrifluoroethylene copolymer (ECTFE), ethylene tetrafluoroethylene (ETFE), polyvinylidene fluoride (PVDF), and combinations thereof.

4. The battery module of claim 1, wherein the porous film has a notch.

5. The battery module of claim 1, wherein the valve further comprises a supporting film stacked on the porous film.

6. The battery module of claim 5, wherein the supporting film has a notch.

7. The battery module of claim 5, wherein the supporting film has a strength greater than that of the porous film, and is configured to pass gas molecules therethrough.

8. The battery module of claim 1, wherein the housing comprises a body having an inner space and a cover coupled with the body, and the valve is installed on the cover.

9. The battery module of claim 1, wherein the housing comprises a body having an inner space and a cover coupled with the body, and the valve is installed on the body.

10. The battery module of claim 1, wherein the valve further comprises a protective bar that crosses the vent opening and contacts the porous film.

11. The battery module of claim 10, wherein the protective bar has a wedge portion contacting the porous film, wherein the wedge portion has a reduced sectional area toward an end thereof.

12. The battery module of claim 1, further comprising a supporting member having a ring shape to closely attach the porous film to the housing.

13. The battery module of claim 12, wherein the supporting member has an opening, and the supporting member further comprises a protrusion having a wedge shape and protruding toward the porous film along a periphery of the opening of the supporting member.

14. The battery module of claim 12, wherein a groove is formed under the vent opening and the porous film, and the supporting member is inserted into the groove.

15. The battery module of claim 1, wherein a protrusion having a wedge shape and protruding toward the porous film is formed along the periphery of the vent opening.

16. A battery module comprising:
a plurality of rechargeable batteries;
a housing configured to receive the rechargeable batteries into an inner space, wherein the housing has a vent opening configured to discharge gas molecules from an interior side of the housing to an exterior side of the housing; and
a valve configured to close the vent opening and to be ruptured at a rupture pressure;
wherein the valve is configured to pass the gas molecules through the valve and block liquid molecules, and wherein a portion of the valve is located in the inner space and is partially on and overlapped with the interior side of the housing.

17. The battery module of claim 16, wherein the valve has a notch.

* * * * *